US011598384B2

United States Patent
Finke et al.

(10) Patent No.: US 11,598,384 B2
(45) Date of Patent: Mar. 7, 2023

(54) SYSTEM AND METHOD TO DISCONNECT AND BRAKE A ROTATING DEVICE

(71) Applicant: Hamilton Sundstrand Corporation, Charlotte, NC (US)

(72) Inventors: Aaron M. Finke, Janesville, WI (US); Andreas C. Koenig, Rockford, IL (US); Tyler W. Hayes, Rockford, IL (US); Mustansir Kheraluwala, Lake Zurich, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/393,349

(22) Filed: Aug. 3, 2021

(65) Prior Publication Data

US 2023/0039164 A1 Feb. 9, 2023

(51) Int. Cl.
*F16D 13/40* (2006.01)
*F16D 67/02* (2006.01)
*F16D 23/12* (2006.01)
*F16D 125/36* (2012.01)

(52) U.S. Cl.
CPC .............. *F16D 67/02* (2013.01); *F16D 13/40* (2013.01); *F16D 23/12* (2013.01); *F16D 2023/123* (2013.01); *F16D 2125/36* (2013.01); *F16D 2500/1045* (2013.01); *F16D 2500/10406* (2013.01)

(58) Field of Classification Search
CPC . F16D 2125/36; F16D 2023/123; F16D 13/40
See application file for complete search history.

(56) References Cited

U.S. PATENT DOCUMENTS

| 10,180,166 | B2 * | 1/2019 | Grosskopf | .............. F16D 23/12 |
| 2019/0351751 | A1 * | 11/2019 | Sato | .......................... B60K 6/26 |

FOREIGN PATENT DOCUMENTS

| CN | 206968383 U | * | 2/2018 | ............. Y02T 10/62 |
| CN | 208299604 U | * | 12/2018 | |
| DE | 10310831 A1 | * | 11/2003 | .......... B60H 1/3204 |
| DE | 102016220712 A1 | * | 4/2018 | .............. F16D 11/14 |
| EP | 2048398 A2 | | 4/2009 | |
| EP | 3121473 A1 | | 1/2017 | |

OTHER PUBLICATIONS

Extended European Search Report dated Dec. 15, 2022 in corresponding European Patent Application No. 22187960.4.

* cited by examiner

*Primary Examiner* — Stacey A Fluhart
(74) *Attorney, Agent, or Firm* — Locke Lord LLP; Joshua L. Jones; Gabby L. Gelozin

(57) ABSTRACT

A disconnect mechanism comprises an input shaft defining a drive axis, a disconnect shaft selectively engaged with the input shaft to be driven about the drive axis by the input shaft, and a disconnect ramp operatively connected to the disconnect shaft to axially move the disconnect shaft between at least a first axial position and a second axial position. A disconnect pawl is selectively engaged with the disconnect ramp shaft, and a brake is selectively engaged with the disconnect shaft in the second axial position.

16 Claims, 3 Drawing Sheets

SYSTEM AND METHOD TO DISCONNECT AND BRAKE A ROTATING DEVICE

BACKGROUND

1. Field

The present disclosure relates to transmission of rotational power, and more particularly to disconnect mechanisms such as used in drivetrains for generators that are used in gas turbine engines.

2. Description of Related Art

Aircraft rely on electrical, pneumatic, and hydraulic systems for secondary power. A typical electrical system utilizes a 3-stage, wound field synchronous (WFS) generator coupled to each engine to provide electric power to the distribution system and loads. One type of WFS generator includes a small permanent magnet generator (PMG) for control and excitation power, an exciter to energize the main field, and a main field generator arranged in a common housing. A primary benefit of the 3-stage design is the ability to electrically turn off current flow in the main field windings during an electrical fault condition. A large single stage PMG offers the potential benefit of an appreciable weight reduction to the generator by eliminating the small PMG and exciter, but current flow in the PMG stator windings cannot be controlled in the same manner as in a 3-stage WFS generator. PMG systems allow the generator to generate fault currents as long as it is rotating.

Conventional methods for stopping the rotation of WFS generators include a separable input shaft and generator rotor shaft. Such conventional methods and systems have generally been considered satisfactory for their intended purpose. However, there is still a need in the art for improved disconnect mechanisms for disconnecting the drive train and avoiding fault currents accompanying spin down of single stage PMGs when conditions warrant. The present disclosure provides a solution for this need.

SUMMARY

A disconnect mechanism comprises an input shaft defining a drive axis, a disconnect shaft selectively engaged with the input shaft to be driven about the drive axis by the input shaft, and a disconnect ramp operatively connected to the disconnect shaft to axially move the disconnect shaft between at least a first axial position and a second axial position. A disconnect pawl is selectively engaged with the disconnect ramp shaft, and a brake is selectively engaged with the disconnect shaft in the second axial position.

The disconnect ramp can include a first end and a second end, where engagement of the disconnect pawl with the first end of the disconnect ramp places the disconnect shaft in the first axial position, and where engagement of the disconnect pawl with the second end of the disconnect ramp places the disconnect shaft in the second axial position. A brake recess can include a friction disk and a biasing member seated within the brake recess to allow axial movement of disconnect shaft and the brake into the brake recess in the second axial position. The brake can be axially spaced apart from the end of the disconnect shaft in the first position, and the brake can engage an axial end of the disconnect shaft in the second position.

Engagement of the disconnect pawl at a position between the first end of the disconnect ramp and the second end of the disconnect ramp can place the disconnect shaft in intermediate axial position between the first axial positon and the second axial position. The intermediate axial position can be a disengaged position such that the disconnect shaft is disengaged from both the input shaft and the brake.

A rotor and a biasing member can be included such that the disconnect shaft is seated in the rotor, and wherein the biasing member biases the disconnect shaft toward the first axial position. In embodiments, the rotor can be splined to the disconnect shaft. A pawl actuator can be operatively connected to drive the disconnect pawl to engage the disconnect ramp to move the disconnect shaft between the first axial position and the second axial position. In certain embodiments, the pawl actuator can be a linear solenoid actuator. In embodiments, a short detection unit can be operatively connected to the pawl actuator to actuate the pawl actuator in response to a detected short circuit.

In accordance with at least one aspect of this disclosure, an electric power generation system can include a generator housing, a stator within the generator housing, an input shaft defining a drive axis extending through the stator, a rotor mechanically connected to the input shaft to rotate about the drive axis, a disconnect mechanism having a disconnect ramp to selectively engage the input shaft to be driven about the drive axis by the input shaft, a brake seated in a brake recess selectively engaged with the disconnect mechanism.

In embodiments, the rotor can be splined to the disconnect shaft, and the disconnect shaft can be configured to disconnect from the input shaft in response to a detected short circuit in an electrical machine or in the electric power generation system. The disconnect ramp can be operatively connected to the disconnect shaft to axially move the disconnect shaft between at least a first axial position and a second axial position.

A disconnect pawl can selectively engaged with the ramp of the disconnect ramp, and a pawl actuator can be operatively connected to drive the disconnect pawl to engage the disconnect ramp to move the disconnect shaft between the first axial position and the second axial position. A short detection unit can be operatively connected to the generator system and the pawl actuator to actuate the pawl actuator in response to a short circuit in the electrical machine or in the electric power generation system.

In accordance with at least one aspect of this disclosure, a method for disconnecting and braking a rotating device includes, actuating a disconnect shaft to disengage the disconnect shaft from an input shaft, and engaging the disconnect shaft with a brake. In embodiments, the brake can engage an axial end of the disconnect shaft, and the method can further include monitoring the rotating device for short circuit faults, and actuating the disconnect shaft and engaging the disconnect shaft upon detection of a short circuit in the rotating device.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
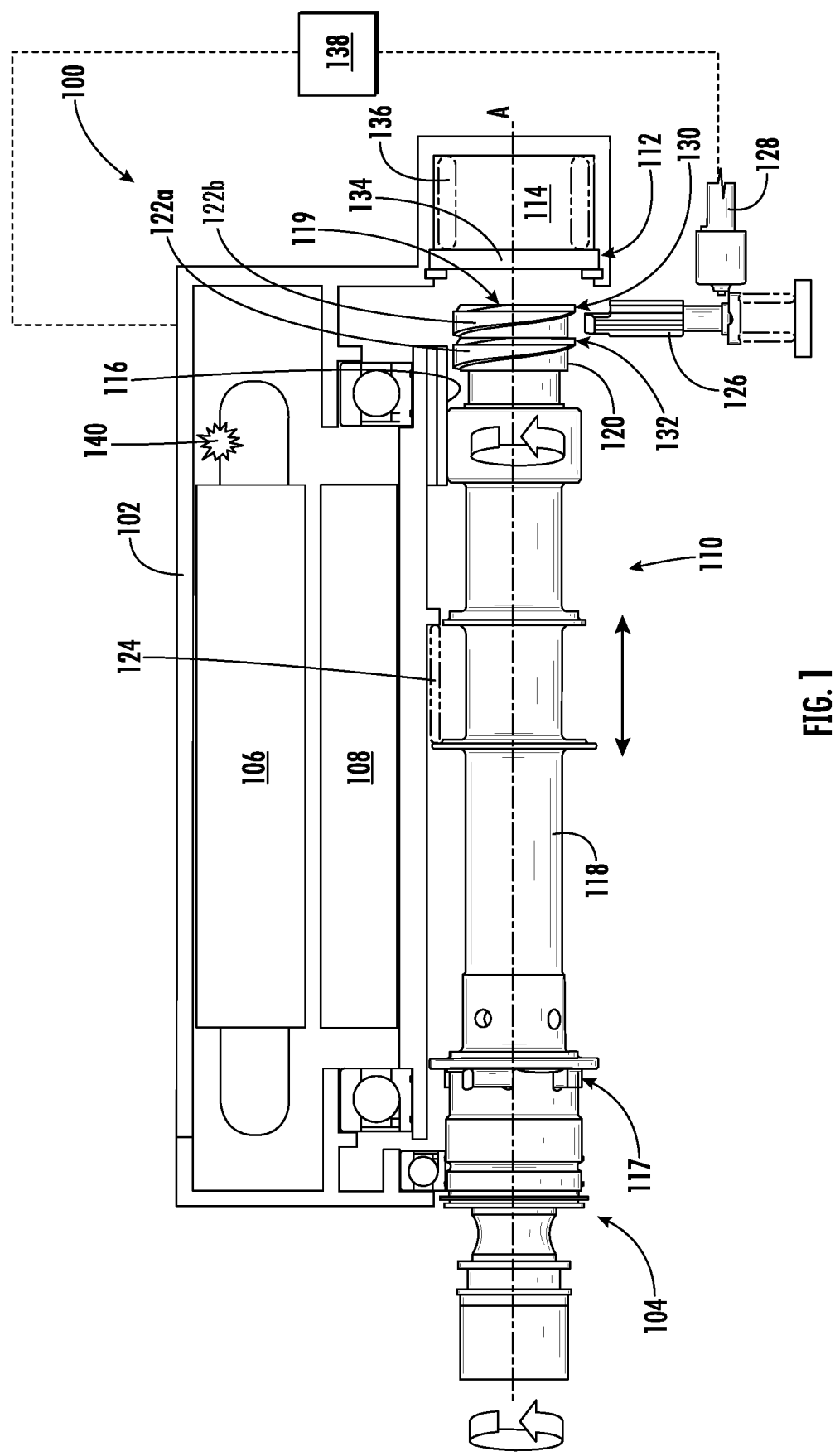
FIG. 1 is a schematic cross-sectional side elevation view of an embodiment of a generator system constructed in accordance with the present disclosure, showing a disconnect mechanism in a first, engaged position.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to reduce the risk of short circuits in rotating electrical devices.

Conventional aerospace electric power generators can be 3-stage wound field devices. The 3-stage design can be particularly beneficial due to the ability to de-excite, or electrically turn off current flow in the main field windings. In certain instances, permanent magnet generators (PMGs) can offer significant weight reductions over the conventional 3-stage wound field generators. However, PMGs pose a challenge in stopping rotation in the event of an electrical fault condition. Conventional disconnect systems used in 3-stage wound field devices provide for disconnection but may still allow the PMG to rotate and generate fault currents as it spins down to 0 rpm. To mitigate fault currents during inertial spin-down, system 100 provides the ability to rapidly decelerate the PMG rotor to 0 rpm after disconnect.

In accordance with at least one aspect of this disclosure, a generator system 100 can include a generator housing 102. Within the housing 102, an input shaft 104 defining a drive axis A extends through a stator 106, and a rotor 108 is mechanically connected to the input shaft 104 to rotate about the drive axis A. A disconnect mechanism 110 can selectively engage the input shaft 104, e.g. from a prime mover such as a gas turbine engine, at a first end 117 to be driven about the drive axis A by the input shaft 104, and a brake 112 is seated in a brake recess 114 to selectively engage with the disconnect mechanism 110 at a second end 119. The rotor 108 can be mechanically connected to the disconnect shaft 118 in any suitable manner, for example the rotor 108 can be splined to the disconnect shaft 118 via splines 116.

Figure 3:
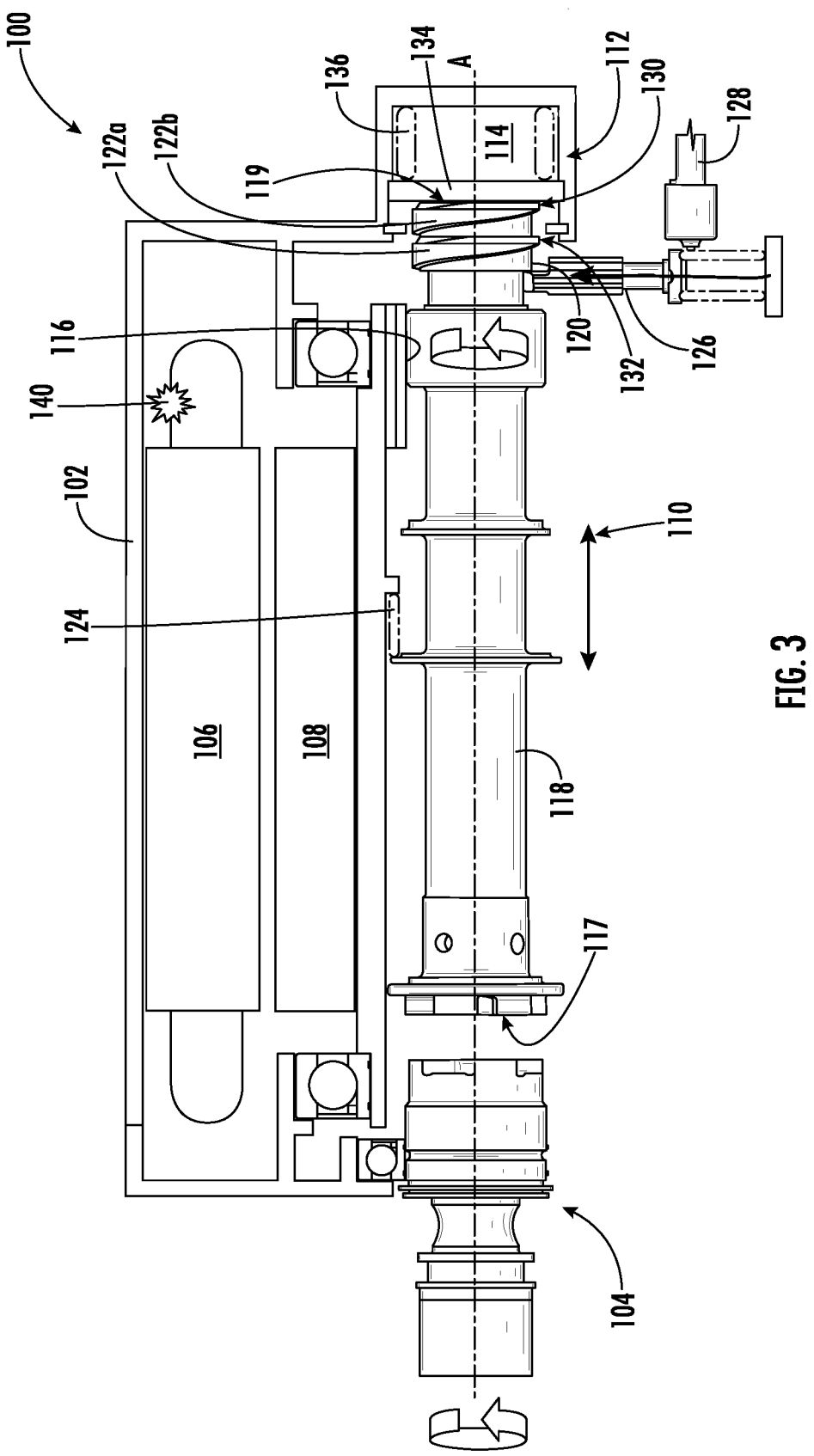
FIG. 3 is a schematic cross-sectional side elevation view of an embodiment of the generator system of FIG. 1, showing the disconnect mechanism in a second, braked position.

The disconnect mechanism 110 comprises the input shaft 104, a disconnect shaft 118, and a disconnect ramp 120 operatively connected to the disconnect shaft 118 to axially move the disconnect shaft 118 between at least a first axial position (e.g. shown in FIG. 1) and a second axial position (e.g. shown in FIG. 3). The disconnect ramp 120 can be a worm gear, having any suitable number of threads 122, for example, two or more threads 122a, 122b. A biasing member 124 can be engaged with the rotor 108 and the disconnect mechanism 110 to bias the disconnect shaft 118 toward the first axial position. The biasing member 124 also operates as a reset, to reset the disconnect shaft 118 into the first axial position after disconnect.

The disconnect mechanism 110 includes a disconnect pawl 126 selectively engaged with the ramp 120 of the disconnect mechanism 110. The disconnect pawl 126 can selectively engage with the ramp 120 via a pawl actuator 128 (e.g. a linear solenoid actuator) operatively connected to drive the disconnect pawl 126 radially to engage the disconnect ramp 120 to move the disconnect shaft 118 between the first axial position and the second axial position. More specifically, the disconnect ramp 120 can include a first end 130 and a second end 132, where engagement of the disconnect pawl 126 with the first end 130 of the disconnect ramp 120 places the disconnect shaft 118 in the first axial position.

Figure 2:
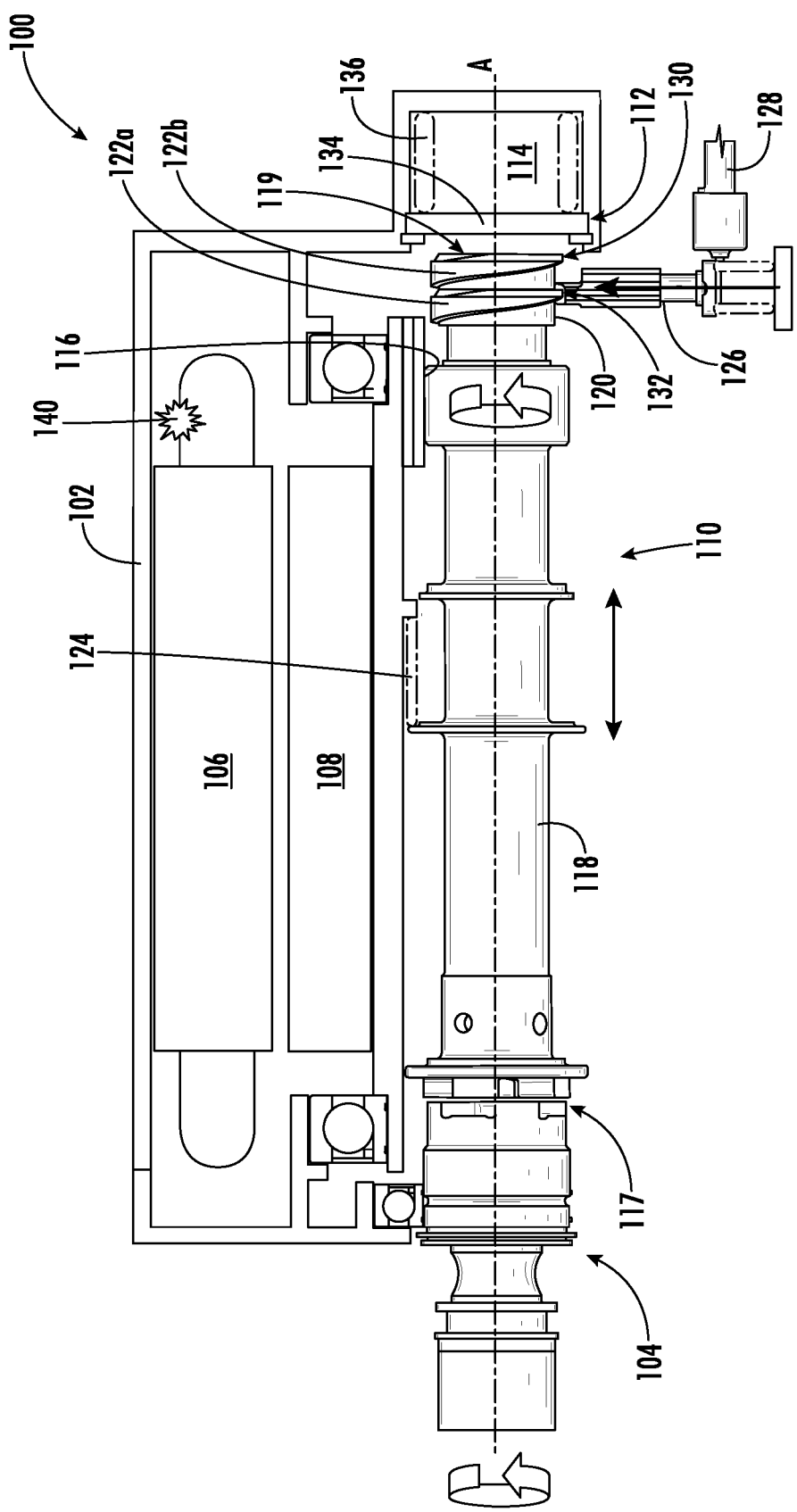
FIG. 2 is a schematic cross-sectional side elevation view of an embodiment of the generator system of FIG. 1, showing the disconnect mechanism in an intermediate, disengaged position.

As the disconnect shaft 118 continues to rotate, the disconnect pawl 126 will engage with the second end 132 of the disconnect ramp, placing the disconnect shaft 118 in the second axial position, by pulling the disconnect shaft 118 axially towards the brake recess 114 to contact the brake 112. Engagement of the disconnect pawl 126 at a position between the first end 130 of the disconnect ramp 120 and the second end 132 of the disconnect ramp 120 places the disconnect shaft 118 in intermediate axial position between the first axial positon and the second axial position (e.g. as shown in FIG. 2). The intermediate axial position can be a disengaged position such that the disconnect shaft 118 is disengaged from both the input shaft 104 and the brake 112, where the disconnect shaft is no longer driven by the input shaft but is not actively engaged with the brake.

In embodiments, (e.g. as shown), the brake recess 114 can include a friction disc 134 and a disc biasing member 136 seated within the brake recess 114 to allow axial movement of disconnect shaft 118 and the disc 134 into the brake recess 114 in the second axial position. The brake 112 can be axially spaced apart from the second 119 end of the disconnect shaft 118 in the first position, and the brake 112 can engage the second end 119 of the disconnect shaft 118 in the second position. For example, compression spring 136 (or a plurality of compression springs) may be included in the recess 114 to bias the friction disc 134 towards the disconnect shaft 118, but allow for the axial movement of the friction disc 134 and the disconnect shaft 118 together into the brake recess 114 in the second axial position. The deceleration rate of the disconnect shaft 118 by the brake 112 can be controlled by adjusting the spring force of the disc biasing members 136, adjusting the contact area between the axial end 119 of the disconnect shaft 118 and the friction disc 134, and/or adjusting the inertia of the rotor 108.

A short detection unit 138 can be operatively connected to the generator system 100 and the pawl actuator 128 to actuate the pawl actuator 128 in response to a short circuit 140 in the generator system 100 or electric power distribution system. The short detection unit 138 may be a generator controller, an active or passive rectifier, or a stand-alone device. Actuating the pawl actuator 128 thus disconnects the disconnect shaft 118 and the rotor 108 from the input shaft 104 in response to the detected short circuit 140 in the generator system 100 or electric power distribution system.

In accordance with at least one aspect of this disclosure, a method for disconnecting and braking a rotating device 100 includes, actuating a disconnect shaft 118 to disengage the disconnect shaft 118 from an input shaft 104, and engaging the disconnect shaft 118 with a brake 112. In embodiments, the brake can engage an axial end 119 of the disconnect shaft 118, and the method can further include monitoring the rotating device 100 for short circuit faults and actuating the disconnect shaft 118 and engaging the disconnect shaft 118 with the brake 112 upon detection of a short circuit in the rotating device 100 or in the electric power distribution system.

The methods and systems of the present disclosure, as described above and shown in the drawings, provide for a PMG rotor to be quickly decelerated to 0 rpm after disconnections from an input shaft, which drastically reduces the time that fault currents could be allowed to flow. Further, this system 100 enables the weight reduction to an engine generator system by utilizing a PMG, while preventing the need to design housing to contain arcing energy.

While the apparatus and methods of the subject disclosure have been shown and described, those skilled in the art will readily appreciate that changes and/or modifications may be made thereto without departing from the scope of the subject disclosure.

What is claimed is:

1. A disconnect mechanism comprising:
an input shaft defining a drive axis;
a disconnect shaft selectively engaged with the input shaft to be driven about the drive axis by the input shaft;
a disconnect ramp operatively connected to the disconnect shaft to axially move the disconnect shaft between at least a first axial position and a second axial position;
a disconnect pawl selectively engaged with the disconnect ramp shaft; and
a brake selectively engaged with the disconnect shaft in the second axial position,
wherein the disconnect ramp comprises a first end and a second end, wherein engagement of the disconnect pawl with the first end of the disconnect ramp places the disconnect shaft in the first axial position, wherein engagement of the disconnect pawl with the second end of the disconnect ramp places the disconnect shaft in the second axial position, wherein the brake is axially spaced apart from the end of the disconnect shaft in the first position.

2. The disconnect mechanism as recited in claim 1, wherein engagement of the disconnect pawl at a position between the first end of the disconnect ramp and the second end of the disconnect ramp places the disconnect shaft in intermediate axial position between the first axial positon and the second axial position.

3. The disconnect mechanism as recited in claim 1, further comprising a rotor and a biasing member, wherein the disconnect shaft is seated in the rotor, and wherein the biasing member biases the disconnect shaft toward the first axial position.

4. The disconnect mechanism as recited in claim 1, further comprising a pawl actuator operatively connected to drive the disconnect pawl to engage the disconnect ramp to move the disconnect shaft between the first axial position and the second axial position.

5. The disconnect mechanism as recited in claim 4, wherein the pawl actuator is a linear solenoid actuator.

6. The disconnect mechanism as recited in claim 4, further comprising a short detection unit operatively connected the pawl actuator to actuate the pawl actuator in response to a detected short circuit.

7. A disconnect mechanism comprising:
an input shaft defining a drive axis;
a disconnect shaft selectively engaged with the input shaft to be driven about the drive axis by the input shaft;
a disconnect ramp operatively connected to the disconnect shaft to axially move the disconnect shaft between at least a first axial position and a second axial position;
a disconnect pawl selectively engaged with the disconnect ramp shaft; and
a brake selectively engaged with the disconnect shaft in the second axial position,
wherein the disconnect ramp comprises a first end and a second end, wherein engagement of the disconnect pawl with the first end of the disconnect ramp places the disconnect shaft in the first axial position, wherein engagement of the disconnect pawl with the second end of the disconnect ramp places the disconnect shaft in the second axial position, wherein the brake engages the axial end of the disconnect shaft in the second position.

8. A disconnect mechanism comprising:
an input shaft defining a drive axis;
a disconnect shaft selectively engaged with the input shaft to be driven about the drive axis by the input shaft;
a disconnect ramp operatively connected to the disconnect shaft to axially move the disconnect shaft between at least a first axial position and a second axial position;
a disconnect pawl selectively engaged with the disconnect ramp shaft; and
a brake selectively engaged with the disconnect shaft in the second axial position,
wherein the disconnect ramp comprises a first end and a second end, wherein engagement of the disconnect pawl with the first end of the disconnect ramp places the disconnect shaft in the first axial position, wherein engagement of the disconnect pawl with the second end of the disconnect ramp places the disconnect shaft in the second axial position, wherein engagement of the disconnect pawl at a position between the first end of the disconnect ramp and the second end of the disconnect ramp places the disconnect shaft in intermediate axial position between the first axial positon and the second axial position, wherein the intermediate axial position is a disengaged position such that the disconnect shaft is disengaged from both the input shaft and the brake.

9. A disconnect mechanism comprising:
an input shaft defining a drive axis;
a disconnect shaft selectively engaged with the input shaft to be driven about the drive axis by the input shaft;
a disconnect ramp operatively connected to the disconnect shaft to axially move the disconnect shaft between at least a first axial position and a second axial position;
a disconnect pawl selectively engaged with the disconnect ramp shaft; and
a brake selectively engaged with the disconnect shaft in the second axial position,
wherein the disconnect ramp comprises a first end and a second end, wherein engagement of the disconnect pawl with the first end of the disconnect ramp places the disconnect shaft in the first axial position, wherein engagement of the disconnect pawl with the second end of the disconnect ramp places the disconnect shaft in the second axial position, further including a brake recess, wherein the brake includes a friction disk and a biasing member seated within the brake recess to allow axial movement of disconnect shaft and the brake into the brake recess in the second axial position.

10. A disconnect mechanism comprising:
an input shaft defining a drive axis;
a disconnect shaft selectively engaged with the input shaft to be driven about the drive axis by the input shaft;

a disconnect ramp operatively connected to the disconnect shaft to axially move the disconnect shaft between at least a first axial position and a second axial position;
a disconnect pawl selectively engaged with the disconnect ramp shaft; and
a brake selectively engaged with the disconnect shaft in the second axial position,
wherein the disconnect ramp comprises a first end and a second end, wherein engagement of the disconnect pawl with the first end of the disconnect ramp places the disconnect shaft in the first axial position, wherein engagement of the disconnect pawl with the second end of the disconnect ramp places the disconnect shaft in the second axial position, further comprising a rotor and a biasing member, wherein the disconnect shaft is seated in the rotor, and wherein the biasing member biases the disconnect shaft toward the first axial position, wherein the rotor is splined to the disconnect shaft.

11. An electric power generation system comprising:
a generator housing;
a stator within the generator housing;
an input shaft defining a drive axis extending through the stator;
a rotor mechanically connected to the input shaft to rotate about the drive axis;
a disconnect mechanism having a disconnect ramp to selectively engage the input shaft to be driven about the drive axis by the input shaft; and
a brake seated in a brake recess selectively engaged with the disconnect mechanism,
wherein the disconnect mechanism includes a disconnect shaft, wherein the rotor is splined to the disconnect shaft, wherein the disconnect shaft is configured to disconnect from the input shaft in response to a detected short circuit in an electrical machine or in the electric power generation system.

12. An electric power generation system comprising:
a generator housing;
a stator within the generator housing;
an input shaft defining a drive axis extending through the stator;
a rotor mechanically connected to the input shaft to rotate about the drive axis;
a disconnect mechanism having a disconnect ramp to selectively engage the input shaft to be driven about the drive axis by the input shaft; and
a brake seated in a brake recess selectively engaged with the disconnect mechanism, wherein the disconnect mechanism includes a disconnect shaft, wherein the disconnect ramp is operatively connected to the disconnect shaft to axially move the disconnect shaft between at least a first axial position and a second axial position.

13. The generator system as recited in claim 12, further comprising a disconnect pawl selectively engaged with the ramp of the disconnect ramp.

14. The generator system as recited in claim 13, further comprising a pawl actuator operatively connected to drive the disconnect pawl to engage the disconnect ramp to move the disconnect shaft between the first axial position and the second axial position.

15. The generator as recited in claim 14, further comprising a short detection unit operatively connected to the stator and the pawl actuator to actuate the pawl actuator in response to a short circuit in the electrical machine or in the electric power generation system.

16. A method for disconnecting and braking a rotating device, comprising:
actuating a disconnect shaft to disengage the disconnect shaft from an input shaft;
and engaging the disconnect shaft with a brake,
wherein the brake engages an axial end of the disconnect shaft, and further comprising;
monitoring the rotating device for short circuit; and
actuating the disconnect shaft and engaging the disconnect shaft upon detection of a short circuit in the rotating device.

* * * * *